(12) United States Patent
Akins et al.

(10) Patent No.: US 7,127,892 B2
(45) Date of Patent: Oct. 31, 2006

(54) TECHNIQUES FOR DETERMINING TURBOCHARGER SPEED

(75) Inventors: Mark D. Akins, Columbus, IN (US);
Dennis King, Columbus, IN (US);
Todd Slater, Columbus, IN (US);
Bryan Milburn, Columbus, IN (US);
Greg Pataky, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 10/918,566

(22) Filed: Aug. 13, 2004

(65) Prior Publication Data

US 2006/0032224 A1  Feb. 16, 2006

(51) Int. Cl.
*F02B 33/44* (2006.01)
*F02D 23/00* (2006.01)

(52) U.S. Cl. .......... 60/600; 60/602; 60/605.2; 60/611; 123/564; 701/100

(58) Field of Classification Search .......... 60/600, 60/602, 611, 605.2; 123/564; 701/100
See application file for complete search history.

(56) References Cited

U.S. PATENT DOCUMENTS

| | | | |
|---|---|---|---|
| 4,634,887 A | 1/1987 | Balch et al. | |
| 4,817,387 A | 4/1989 | Lashbrook | |
| 4,882,905 A * | 11/1989 | Kawamura | 60/608 |
| 5,377,112 A | 12/1994 | Brown, Jr. et al. | |
| 5,574,645 A | 11/1996 | Meeker et al. | |
| 5,585,553 A | 12/1996 | Schricker | |
| 5,910,176 A | 6/1999 | Creger | |
| 5,974,870 A | 11/1999 | Treinies et al. | |
| 6,042,505 A | 3/2000 | Bellinger | |
| 6,202,415 B1 | 3/2001 | Lohmann et al. | |
| 6,209,390 B1 | 4/2001 | LaRue et al. | |
| 6,220,223 B1 | 4/2001 | Weisman, II et al. | |
| 6,234,149 B1 | 5/2001 | Mills et al. | |
| 6,240,343 B1 | 5/2001 | Sarangapani et al. | |
| 6,250,145 B1 | 6/2001 | Honold et al. | |
| 6,256,942 B1 | 7/2001 | Schatz | |
| 6,256,992 B1 | 7/2001 | Lewis, Jr. et al. | |
| 6,272,859 B1 * | 8/2001 | Barnes et al. | 60/602 |
| 6,298,718 B1 | 10/2001 | Wang | |
| 6,314,359 B1 | 11/2001 | Janic et al. | |
| 6,387,011 B1 | 5/2002 | Bellinger | |
| 6,401,457 B1 | 6/2002 | Wang et al. | |
| 6,436,005 B1 | 8/2002 | Bellinger | |
| 6,497,227 B1 | 12/2002 | Wang et al. | |
| 6,539,714 B1 | 4/2003 | Wang | |
| 6,546,329 B1 | 4/2003 | Beliinger | |
| 6,637,205 B1 * | 10/2003 | Ahmad et al. | 60/608 |
| 6,644,029 B1 | 11/2003 | Weinreuter | |
| 6,687,601 B1 | 2/2004 | Bale et al. | |
| 6,698,203 B1 | 3/2004 | Wang | |
| 6,725,659 B1 | 4/2004 | Shao et al. | |
| 6,804,601 B1 * | 10/2004 | Wang et al. | 60/602 |
| 2003/0182048 A1 | 9/2003 | Wang et al. | |
| 2003/0216847 A1 | 11/2003 | Bellinger | |

* cited by examiner

*Primary Examiner*—Sheldon J Richter
(74) *Attorney, Agent, or Firm*—Krieg DeVault LLP; J. Bruce Schelkopf

(57) ABSTRACT

One embodiment of the present invention includes an internal combustion engine with a turbocharger. The turbocharger includes a compressor with an outlet coupled to an intake of the engine and a turbine coupled to an exhaust manifold of the engine. A a turbocharger speed estimate is determined from engine speed and a ratio between inlet and boost pressure for the compressor. The turbocharger speed estimate is further adjusted as a function of compressor boost pressure variation with time.

21 Claims, 4 Drawing Sheets

TECHNIQUES FOR DETERMINING TURBOCHARGER SPEED

BACKGROUND AND SUMMARY OF THE APPLICATION

The present invention relates to internal combustion engines, and more particularly, but not exclusively, is relates to operation of an internal combustion engine with a turbocharger.

Turbochargers are well known devices for pressurizing intake air entering the combustion chambers of an internal combustion engine to thereby increase the efficiency and power output of the engine. Generally, pressurizing the intake air increases the quantity of air entering the engine combustion chambers during intake, permitting more fuel to be utilized in establishing a fuel charge with a desired air-to-fuel ratio. Typically, increased engine torque and power results compared to a similar engine that is not turbocharged.

In a turbocharged engine, the exhaust manifold of the engine is in fluid communication with a rotatable turbine of the turbocharger via an exhaust conduit, and the exhaust gas flowing through this conduit causes the turbine to turn at a rate determined by exhaust gas pressure and flow rate. A compressor of the turbocharger is mechanically coupled to the turbine. The compressor is rotatably driven by the turbine as it turns. An inlet of the compressor receives fresh ambient air, and an outlet of the compressor is in fluid communication with an intake manifold of the engine via an intake conduit. The rotation of the compressor increases the amount of intake air supplied to the engine, which results in an increased pressure, often referred to as the "boost" pressure.

An exhaust gas recirculation (EGR) system implemented in such a turbocharged engine supplies controlled amounts of exhaust gas from the exhaust manifold to the intake manifold via an EGR conduit. In order to sustain positive EGR flow through the EGR conduit, pressure in the exhaust conduit is maintained at a level greater than that in the intake conduit, and turbochargers in EGR-based engines typically operate at higher rotational speeds than those without EGR. In either case, it is often desirable to have accurate knowledge of the turbocharger rotational speed—particularly for turbocharged engines with EGR to ensure positive EGR flow while maintaining turbocharger speed within safe operating limits.

In cases where implementation of a turbocharger speed sensor is impractical or cost prohibitive, and/or in cases where redundant or "back-up" turbocharger speed information is desired, what is needed is a system for accurately estimating or synthesizing turbocharger rotational speed. Thus, a demand remains for further contributions in this area of technology.

In one embodiment of the present invention, a unique technique for determining turbocharger speed is provided. In other embodiments, unique methods, systems, and apparatus for determining turbocharger speed are provided.

A further embodiment includes: sensing speed of an internal combustion engine having a turbocharger with a compressor that includes an inlet and an outlet. This outlet is coupled to an intake of the engine. The embodiment further includes sensing inlet pressure and boost pressure of the compressor and determining a value corresponding to turbocharger speed from the speed of the internal combustion engine, the inlet pressure, and the boost pressure. This value is refined as a function of change of the boost pressure with time to represent the turbocharger speed.

Another embodiment comprises: providing an internal combustion engine including a turbocharger with a compressor that has an outlet coupled to an intake of the engine; determining a turbocharger speed estimate from speed of the engine and a pressure ratio for the compressor; and adjusting the turbocharger speed estimate as a function of compressor boost pressure variation with time.

Still another embodiment comprises: an internal combustion engine; a speed sensor operable to provide a first signal representative of engine speed; a turbocharger including a compressor with an inlet and an outlet that is coupled to an intake of the engine; a pressure sensing arrangement operable to provide a second signal representative of intake pressure of the compressor and a third signal representative of outlet pressure of the compressor; and a controller responsive to the first signal, the second signal, and the third signal to determine a value as a function of the engine speed and a pressure ratio. This ratio is taken between the intake pressure and the outlet pressure. The controller is further operable to adjust the value based on variation of the outlet pressure with time to provide a signal representative of turbocharger speed.

Yet another embodiment of the present invention comprises: means for sensing speed of an internal combustion engine that includes a turbocharger. A compressor of the turbocharger includes an inlet and an outlet coupled to an intake of the engine. The embodiment further comprises: means for filtering the speed of the internal combustion engine; means for sensing inlet temperature, inlet pressure, and boost pressure of the turbocharger compressor; means for filtering the boost pressure; means for determining a value corresponding to uncorrected turbocharger speed from the speed of the internal combustion engine, the inlet pressure, and the boost pressure; means for correcting the value with the inlet temperature to correspond to a temperature corrected turbocharger speed; and means for refining the value as a function of change of the boost pressure with time to provide a refined turbocharger speed.

These and further embodiments, forms, features, objects, advantages, benefits, and aspects of the present invention shall become apparent from the detailed description and drawings provided herewith.

DESCRIPTION OF SELECTED EMBODIMENTS

Figure 1:
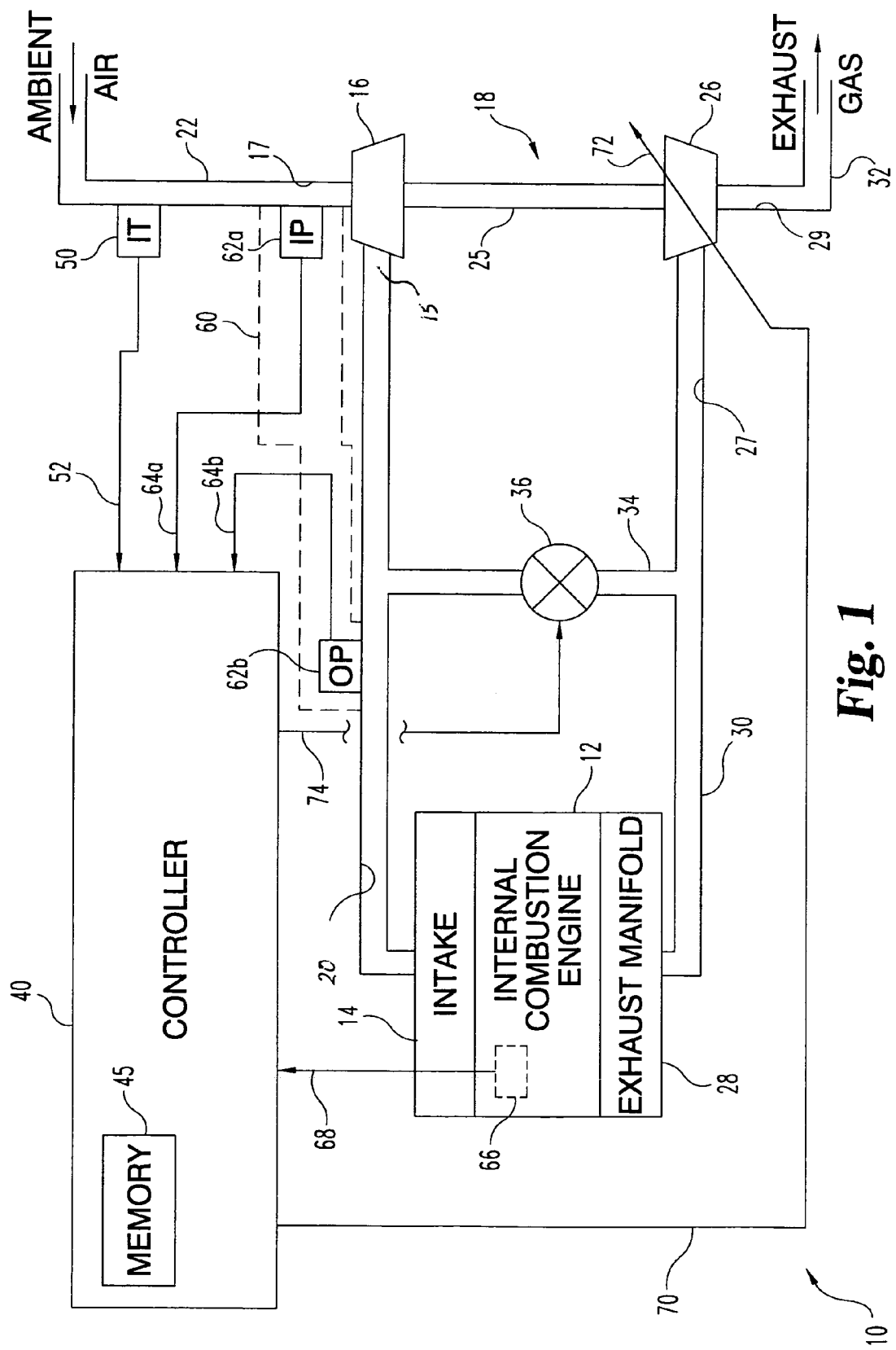
FIG. 1 is a diagrammatic illustration of an engine system of one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring now to FIG. 1, engine system 10 of one embodiment of the present invention is illustrated. System 10 includes internal combustion engine 12 and turbocharger 18. Turbocharger 18 includes compressor 16 and turbine 26. Engine 12 includes intake manifold 14 fluidly coupled to outlet 15 of compressor 16 via compressed air conduit 20. Compressor 16 includes compressor inlet 17 coupled to intake conduit 22 for receiving fresh air therefrom. Optionally, an intake air cooler of known construction can be disposed in-line with conduit 20 between turbocharger compressor 16 and intake manifold 14 (not shown). Turbocharger compressor 16 is mechanically coupled to turbine 26 via drive coupling 25, wherein turbine 26 includes turbine inlet 27 fluidly coupled to exhaust manifold 28 of engine 12 via exhaust conduit 30, and further includes turbine outlet 29 fluidly coupled to ambient via exhaust conduit 32. EGR valve 36 is disposed in line with EGR conduit 34. Conduit 34 is in fluid communication with conduit 20 and exhaust conduit 30. Optionally, an EGR cooler of known construction can be disposed in-line with EGR conduit 34 between EGR valve 36 and conduit 20 (not shown).

In one form, engine 12 is of a conventional, four-stroke, reciprocating piston variety. However, in lieu of a reciprocating piston-based engine, a rotor-based engine may be utilized in an alternative embodiment of the present invention. Also, in other embodiments, an engine with a different number of operating cycles, such as a two-cycle sequence, may be utilized. Coupling 25 may be in the form of a rotatable drive shaft, pulley and belt arrangement, intermeshing gears, a combination of these, and/or such other arrangement to drive compressor 16 with turbine 26 as would occur to those skilled in the art. In still other embodiments, multistage compressors, multistage turbines, or a combination of these are envisioned.

System 10 includes controller 40 that is preferably microprocessor-based and is generally operable to control and manage the overall operation of engine 12. Controller 40 includes memory 45 as well as a number of inputs and outputs for interfacing with various sensors and systems coupled to engine 12. Controller 40 can be provided in the form of one or more components based on digital circuitry, analog circuitry, or a combination of these; and/or can be based on one or more central processing units (CPUs), arithmetic logic units (ALUs), or the like; of a RISC, CISC, or any other variety. For a multiple component form, such components can be integrated in a single unit or remotely located relative to one another. Controller 40, in one embodiment, may be a known control unit sometimes referred to as an electronic or engine control module (ECM), electronic or engine control unit (ECU) or the like, or may alternatively be a general purpose control circuit capable of operating as further described hereinafter. Controller 40 includes desired support components, such as a power supply, signal conditioners, filters, limiters, format converters (such as analog-to-digital and/or digital-to-analog types), input/output controllers, communications ports, operator input/output devices, and the like as would occur to those skilled in the art. Memory 45 can be comprised of one or more types, including, but not limited to electronic, optical, and/or electromagnetic varieties and/or can be volatile, nonvolatile, or a combination of these.

Controller 40 preferably executes operating logic to perform one or more control routines, as will be described in greater detail hereinafter. Such logic can be in the form of software or firmware programming instructions, dedicated hardware (such as a synchronous state machine or asynchronous machine), one or more signals encoded to provide controller instructions and/or direct controller operation, or a combination of these, to name just a few examples. In one form, controller operating logic is arranged to partially or completely execute a control routine to determine a turbocharger speed estimate based on input signals from a number of engine and/or turbocharger operating condition sensors as will be more fully described in connection with FIGS. 3 and 4.

Controller 40 includes a number of inputs for receiving signals from various sensors or sensing subsystems associated with system 10. For example, system 10 includes temperature sensor 50 that is disposed in fluid communication with intake conduit 22 and electrically connected to controller 40 via signal path 52. Sensor 50 may be of known construction and generally operable to provide compressor inlet temperature signal (IT) via signal path 52 that is indicative of the temperature of ambient air entering inlet 17 of compressor 16 (i.e., entering the intake conduit 22). Alternatively, sensor 50 need not be disposed in fluid communication with intake conduit 22 and may instead be positioned in any convenient location relative to system 10 to produce a signal on signal path 52 indicative of the temperature of fresh ambient air entering conduit 22. In one alternative, IT is sometimes or always synthesized or otherwise estimated based on one or more other sensors and/or operating parameters.

System 10 further includes pressure sensing arrangement 60. Arrangement 60 includes pressure sensor 62a and pressure sensor 62b electrically connected to controller 40 via signal paths 64a and 64b, respectively. Sensor 62a may be of known construction and is generally operable to produce a compressor inlet pressure signal (IP) on signal path 64a that is indicative of the pressure of ambient air entering inlet 17 of compressor 16 (i.e., entering intake conduit 22). It is to be understood that for the purposes of the present invention, sensor 54 need not be disposed in fluid communication with intake conduit 22 and may instead be positioned in any convenient location relative to system 10 as long as sensor 62a is operable to produce a signal on signal path 64a indicative of the pressure of ambient air entering conduit 22. Pressure sensor 62b is disposed in fluid communication with conduit 20 and electrically connected to an input (IN4) of engine controller 40 via signal path 64. Sensor 62b may be of known construction and is generally operable to produce a compressor outlet pressure signal (OP) on signal path 64b that is indicative of the pressure within conduit 20 (also the same as compressor "boost" pressure or compressor outlet pressure). It should be appreciated that outlet pressure/boost pressure of compressor 16 can be provided by sensor 62b regardless of its position along conduit 20, such that sensor 62b may be upstream or downstream of conduit 34 and/or any other equipment that may be fluidly coupled to conduit 20 between compressor 16 and intake 14, like an intake air cooler (not shown). In other embodiments, arrangement 60 can include more or fewer sensors and/or one or more pressure signals can be sometimes or always be synthesized or otherwise estimated from one or more other sensors and/or operating parameters.

System 10 further includes engine speed sensor 66 that is electrically connected to controller 40 via signal path 68. In one embodiment, sensor 66 is a Hall effect type operable to sense passage of each of a number of teeth formed on a gear or tone wheel that rotates synchronously with engine 12. Alternatively, sensor 66 may be a variable reluctance sensor or other known speed sensor, and is in any case operable to produce a speed signal (ES) on signal path 68 indicative of the rotational speed of engine 12. In still other embodiments, speed can be sometimes or always synthesized or otherwise estimated based on one or more other sensors and/or operating parameters.

Controller 40 also includes a number of outputs for controlling one or more engine control mechanisms associated with engine 12 and/or system 10. For example, controller 40 also includes at least one output for controlling turbocharger swallowing capacity/efficiency, wherein the term "turbocharger swallowing capacity/efficiency" is defined for purposes of the present invention as the gas flow capacity of the turbocharger turbine 26. For example, as illustrated in FIG. 1, controller 40 is electrically connected to a turbocharger swallowing capacity/efficiency control mechanism 72 via signal path 70, wherein the turbocharger swallowing capacity/efficiency control mechanism 72 is responsive to one or more turbocharger control signals to modify the swallowing capacity and/or efficiency of turbocharger 18. In general, the present invention contemplates controlling the swallowing capacity and/or efficiency of the turbocharger 18 via one or more known control mechanisms 70 under the direction of controller 40. Examples of such control mechanisms include, but are not limited to, any combination of a mechanism for varying the geometry of the turbocharger turbine 26, a wastegate disposed between conduits 30 and 32 for selectively diverting exhaust gas from the turbocharger turbine 26, and an exhaust throttle for selectively controlling the flow rate of exhaust gas through either of conduits 30 and 32. Controller 40 further includes a second output electrically connected to EGR valve 36 via signal path 74. Controller 40 is operable, in a known manner, to control the cross-sectional flow area of valve 36 to selectively control the flow of recirculated exhaust gas therethrough.

Based on conventional compressor flow dynamics, it has been established that given any two of the following variables, the remaining may be uniquely determined:

$$[TS/sqrt(IT), OP/IP, MAF*sqrt(IT)/IP],$$

where: MAF is the mass flow of air entering inlet 17 of turbocharger compressor 16; IT is the temperature of air entering the compressor 16; IP is the pressure of air entering the compressor 16; OP is the pressure of air within conduit 20 (i.e., at outlet 15 of the turbocharger compressor 16), and therefore represents the absolute boost pressure within conduit 20; TS is the rotational speed of the turbocharger 18; and "sqrt()" is a square root operator that returns the square root of the operand within the parenthesis.

In the above relationships, the term TS/sqrt(IT) refers to a temperature-corrected turbocharger speed, hereinafter represented as CTS; the term OP/IP refers to compressor pressure ratio, hereinafter represented as PR; and the term MAF*sqrt(IT)/IP refers to a corrected compressor mass flow rate, hereinafter represented as CMAF. Relationships between CTS, PR, and CMAF may be represented by a compressor map of the type illustrated in FIG. 2 of commonly owned U.S. Pat. No. 6,539,714, which is hereby incorporated by reference in its entirety. From such relationships, it has been found that temperature-corrected turbocharger rotational speed, CTS, can be estimated according to equation (1) as follows:

$$CTS = f(PR, CMAF) \qquad (1).$$

Accordingly, for embodiments that include a mass air flow sensor disposed in fluid communication with intake conduit 22, CTS can be derived directly as a function of measured values for PR and CMAF. However, in embodiments of system 10 that do not include such a mass air flow sensor, and/or in embodiments that include an intake mass air flow sensor or CMAF synthesis technique of unacceptable accuracy or precision, it may not be desired to directly determine CTS as a function of PR and CMAF.

It has also been found that temperature-corrected turbocharger speed, CTS, is more sensitive to changes in compressor pressure ratio, PR, than to corrected compressor mass flow, CMAF. Knowledge of current engine speed, ES, enables mapping of compressor pressure ratio (CR) fluctuations to constant temperature-corrected turbocharger speed values (CTS). As a result, equation (2) follows:

$$CTS = f(PR, ES) \qquad (2),$$

such that an estimated or synthesized turbocharger speed $(TS_E)$ is then defined by the equation (3) as follows:

$$TS_E = sqrt(IT) * f[(OP/IP), ES] \qquad (3).$$

Figure 2:
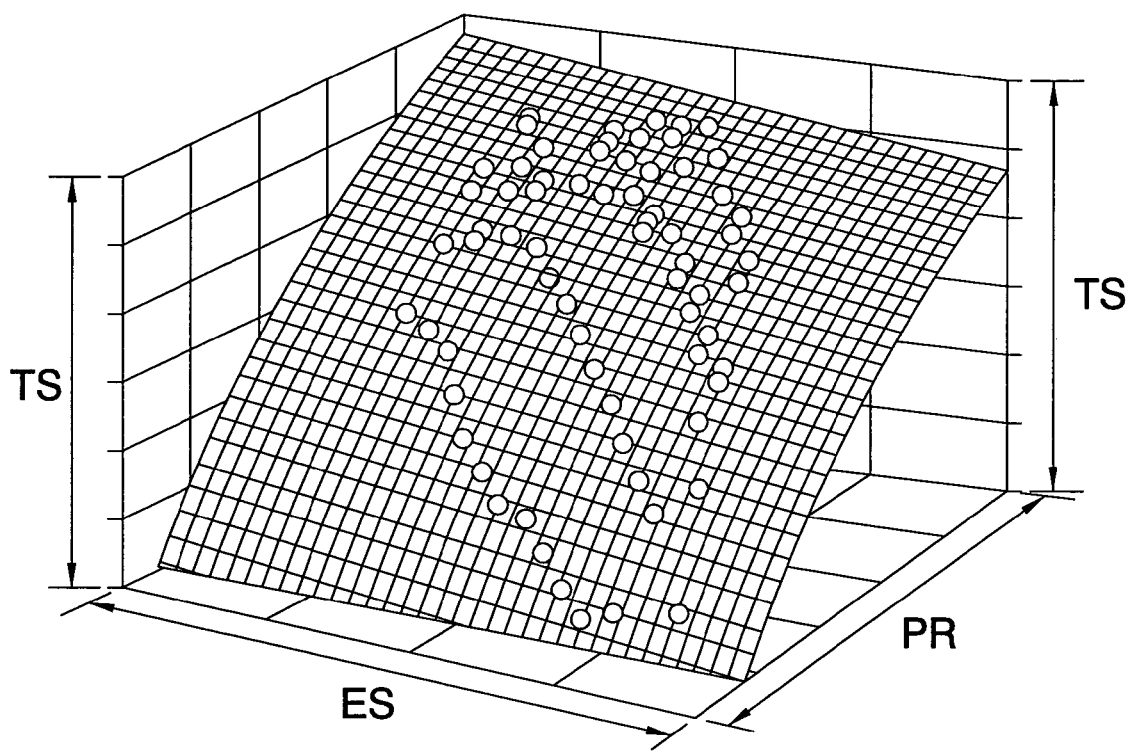
FIG. 2 is a graph characterizing a three-dimensional relationship for the system of FIG. 1.

FIG. 2 provides a three-dimensional plot 110 of uncorrected turbocharger speed, TS; compressor pressure ratio, PR; and engine speed, ES; that characterizes an engine system of the type described with respect to FIG. 1. For every given pair of PR and ES, plot 110 illustrates that there exists a uniquely determined turbocharger speed value, TS.

Figure 3:
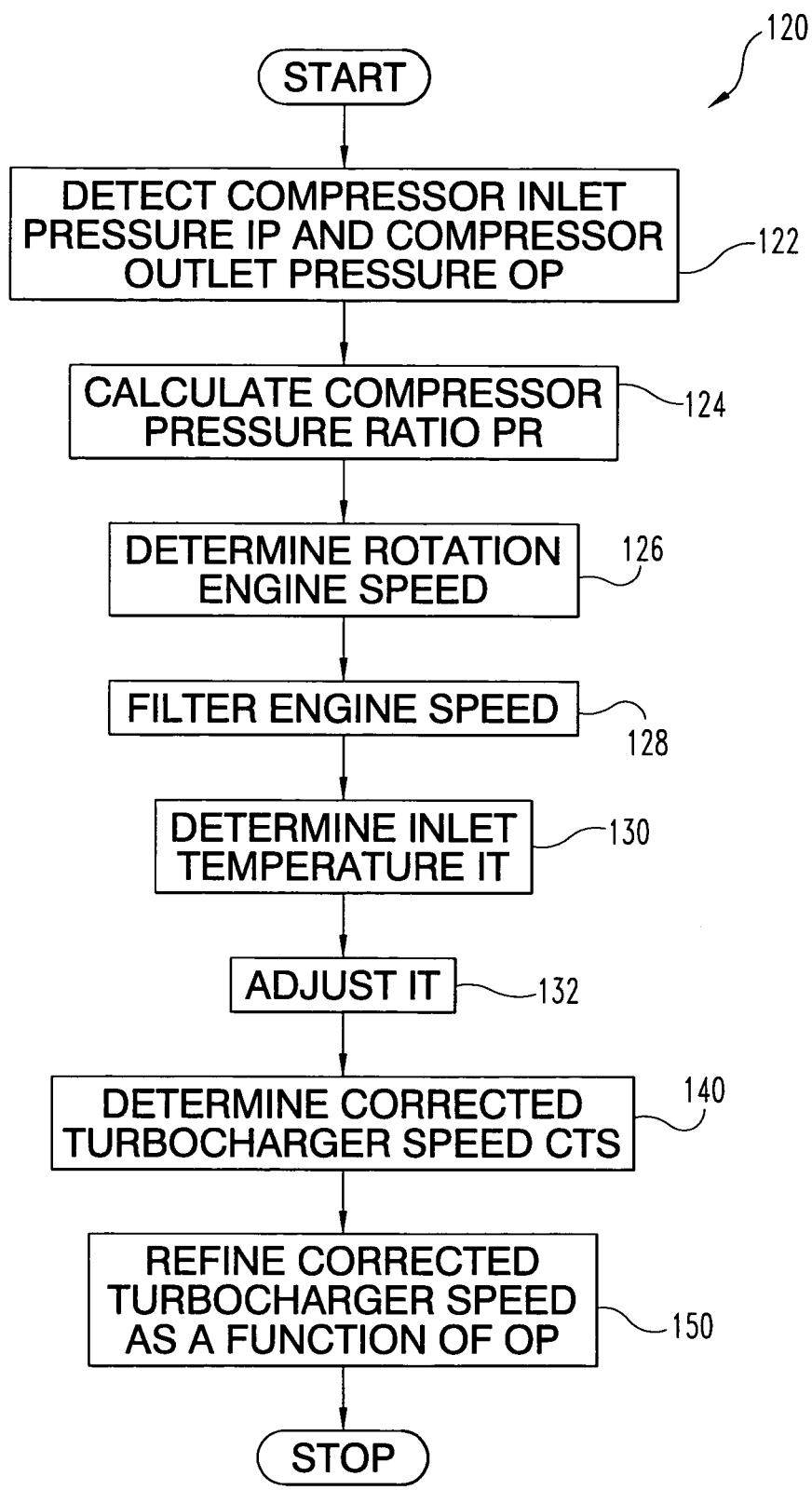
FIG. 3 is a flowchart of a turbocharger speed estimation routine that can be implemented with the system of FIG. 1.
Figure 4:
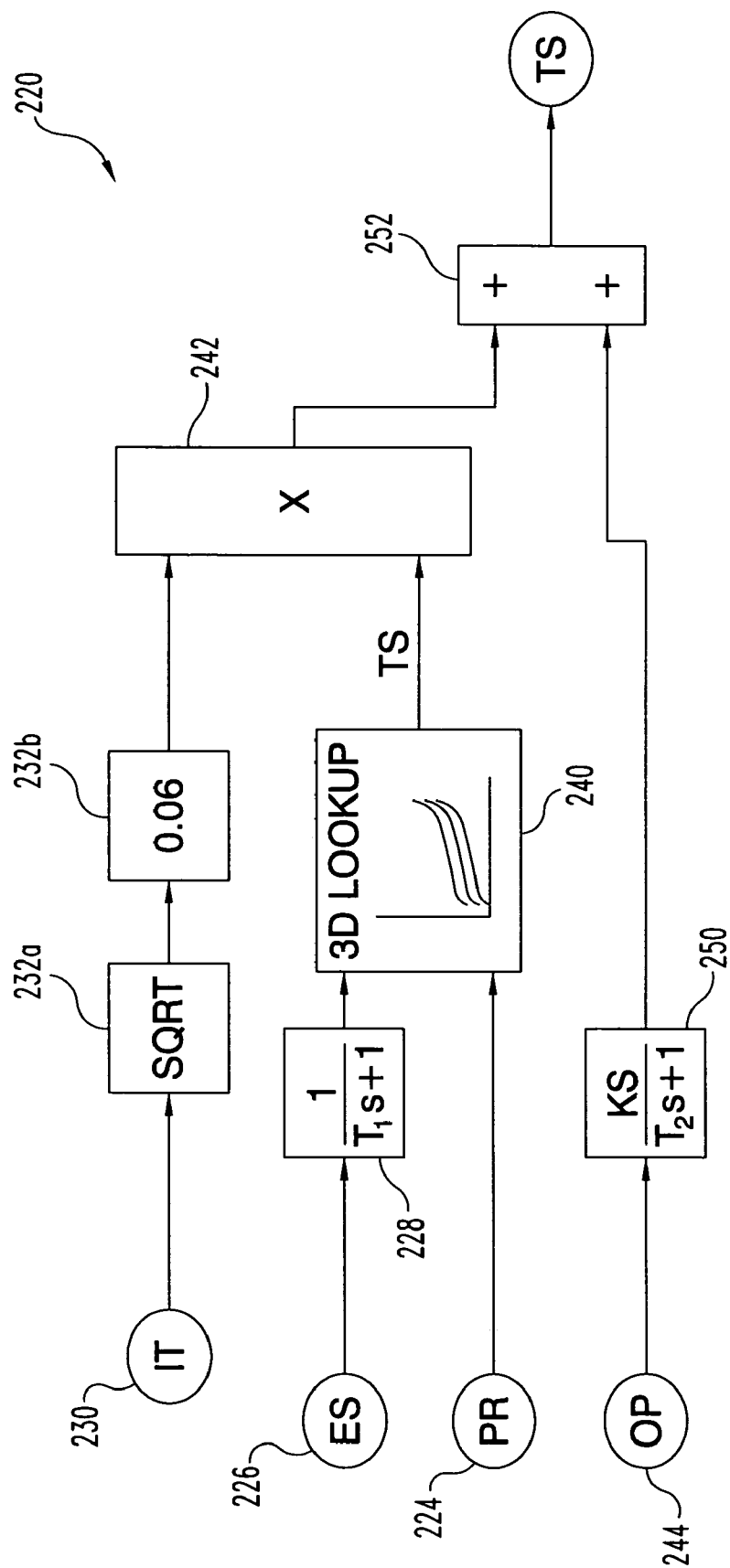
FIG. 4 is a control diagram corresponding to the routine of FIG. 3.

FIG. 3 illustrates control routine 120 in flowchart form. Routine 120 provides one nonlimiting embodiment of a procedure for estimating or synthesizing turbocharger rotational speed. Routine 120 corresponds to control flow diagram 220 of FIG. 4, which is described in tandem. Routine 120 can be implemented with system 10, performing in accordance with operating logic of controller 40. In one form, routine 120 is provided as programming instructions stored in memory 45 and executed in a known manner by controller 40. In other embodiments, routine 120 is implemented with a different system and/or with different operating logic.

Routine 120 begins with operation 122. In operation 122, compressor inlet pressure, IP, is determined via information provided by pressure sensor 62*a* (FIG. 1) and compressor outlet pressure, OP, is determined via information provided by pressure sensor 62*b*. Routine 120 continues with operation 124 in which the compressor pressure ratio, PR, is calculated as a ratio of OP and IP. The PR input is designated as input 224 in control flow diagram 220 of FIG. 4. It should be appreciated that the inverse of PR, PR multiplied by a known constant, and/or another suitable function of PR could be used with appropriate adjustments. Operation 124 can include imposition of a range of values on IP to avoid a "divide by zero" situation and/or to prevent an unrealistically low PR, such as might arise due to sensor failure.

Routine 120 proceeds from operation 124 to operation 126. In operation 126, rotational engine speed, ES, is determined from information provided by speed sensor 66, which corresponds to input 226 of control flow diagram 220. From operation 126, routine continues with operation 128. In operation 128, ES is submitted to a low pass filter to remove transients. In control flow diagram 220, filter 228 corresponds to operation 128. Filter 228 is shown in complex variable form $(T_1 s+1)^{-1}$ with filter time constant $T_1$. Typically, filter 228 is implemented as a discrete software-defined form of digital filter.

From operation 128, operation 130 is reached in which inlet temperature, IT, is determined via information from sensor 50. Operation 130 corresponds to input 230 of control flow 220. From operation 130, routine 120 continues with operation 132 in which IT is adjusted for performance of turbocharger speed temperature correction. Operation 132 calculates the square root of IT (operator 232a of control flow 220) and multiplies by a conversion factor of 0.06 (operator 232b of control flow 220) to provide temperature correction factor TCF=0.06*(IT)$^{1/2}$. The conversion factor of operator 232b corresponds to 60 sec/1000 RPM, which may vary in different embodiments.

From operation 132 of routine 120, operation 140 is reached which uses PR and the filtered ES as inputs to provide an uncorrected TS from a three-variable relationship, such as plot 110 of FIG. 2, which is represented by 3-D map operator 240 in control flow diagram 220. The present invention contemplates a number of techniques for executing operation 140 (3-D map operator 240) to provide TS based on input variables PR and ES. For example, in one embodiment, the data in plot 110 may be stored in memory 45 in one or more graphical or tabular forms. In this embodiment, controller 40 is operable to execute operation 140 by mapping current values of PR and ES to determine TS. If the current values of PR and ES are between data points, estimated values may be obtained using known linear and/or nonlinear interpolation techniques.

In an alternate embodiment, the three-dimensional relationship of plot 110 of FIG. 2 may be represented by a polynomial stored within memory 45, that can be solved for TS given known values of the two remaining parameters. For example, plot 110 of FIG. 2 represents a smooth surface and can therefore be modeled as a second-order polynomial according to equation (4) as follows:

$$TS=a+b*PR+c*PR^2+d*ES+e*ES^2+f*PR*ES \quad (4),$$

where: a, b, c, d, e and f represent model constants. In this embodiment, controller 40 is operable to execute operation 140 of routine 120 by solving equation (4) as a function of the current values of PR and ES.

In yet another alternate embodiment, the three-dimensional plot 110 of FIG. 3 may be modeled by a two-input neural network trained as an appropriate surface for fitting the data points of TS according to the known variables PR and ES. In this embodiment, controller 40 is operable to execute operation 140 of routine 120 by computing TS according to the two-input neural network.

In a further alternate embodiment, the plot 110 of FIG. 2 may be modeled as a second-order polynomial for PR and a scaling function of ES according to the equation:

$$TS=(a+b*PR+c*PR^2)*f(ES) \quad (5),$$

where: the term $(a+b*PR+c*PR^2)$ represents the second-order PR model; $f(ES)$ is a scaling factor depending upon the current value of engine rotational speed; and a, b, and c represent model constants. In this embodiment, controller 40 is operable to execute operation 140 of routine 120 by solving equation (5) for TS. In still other forms, a combination of these approaches could be used to implement operation 140/operator 240, any 3-D data can be represented by two or more two-dimensional tables, maps, or the like; or different techniques can be utilized as would occur to those skilled in the art.

The multiplier 242 of control flow diagram 220 represents the application of TCF to the output of 3-D map operator 240, in any of its various forms, to provide CTS from TS. Specifically, CTS=TS*TCF=TS*0.06*sqrt (IT). Multiplier 242 is encompassed in operation 140 to produce CTS. It should be noted that the conversion factor 0.06 can alternatively be incorporated in operator 240 or 242. Alternatively or additionally, operation 140, and correspondingly operator 240, can be arranged using standard techniques to provide CTS as an output based on inputs PR and ES, instead of TS, by taking into account the square root of IT and applicable correction factors. In one alternative, IT is treated as an input, along with PR and ES, to provide a corresponding CTS value based on a four variable relationship that is provided as a map, table, polynomial or other mathematical equation(s), neural network, or the like, to name just a few possible examples. In yet other embodiments, it may not be desired to correct for inlet temperature or to only selectively correct for temperature when estimating or synthesizing turbocharger speed from PR and ES as a function of time.

From operation 140, routine 120 continues with operation 150. In operation 150, the corrected turbocharger speed, CTS, is further refined as a function of outlet pressure, OP. OP corresponds to input 244 in control flow diagram 220. In one form, this function of OP includes low pass filtering and taking the first derivative with respect to time. The result is combined with CTS to provide the refined output. Referring to control flow diagram 220, the filtering and time derivative are represented in operator 250 in complex, Laplace variable form by $Ks/(T_2s+1)$ where: time constant $T_2$ is for the low pass filter of OP, and K is a constant applied to OP. Typically, operator 250 is implemented in a discrete form through programming instructions. Summation operator 252 combines the refinement or adjustment factor from operator 250 by adding it to the corrected turbocharger speed CTS output from operator 242. Operators 250 and 252 are embodied in operation 150 of routine 120.

It has been found that filtering via operations 128 and 150 (and correspondingly operators 228 and 250), reduce the likelihood of error due to spikes and transients that might occur during rapid changes in engine speed ES. Furthermore, the time derivative component for boost pressure (OP), as embodied in operation 150 and operator 250, frequently enhances prediction during rapid engine speed changes because boost pressure typically lags system adjustments.

As used herein, it should be appreciated that: variable, criterion, characteristic, quantity, amount, value, constant, flag, data, record, threshold, limit, input, output, matrix, command, and look-up table, each generally correspond to one or more signals within processing equipment of the present invention. It is contemplated that various functional blocks, operators, operations, stages, conditionals, procedures, thresholds, and processes described in connection with the present invention could be altered, rearranged, substituted, deleted, duplicated, combined, or added as would occur to those skilled in the art without departing from the spirit of the present invention.

All publications, patent, and patent applications cited in this specification are herein incorporated by reference as if each individual publication, patent, or patent application were specifically and individually indicated to be incorporated by reference and set forth in its entirety herein. Any theory of operation or finding described herein is merely intended to provide a better understanding of the present invention and should not be construed to limit the scope of the present invention as defined by the claims that follow to any stated theory or finding. While the invention has been illustrated and described in detail in the drawings and foregoing description, the same is to be considered as illustrative and not restrictive in character, it being understood that only the preferred embodiment has been shown and described and that all changes, modifications, and equivalents that come within the spirit of the invention as previously described or illustrated heretofore and/or defined by the following claims are desired to be protected.

What is claimed is:

1. A method, comprising:
sensing speed of an internal combustion engine, the engine including a turbocharger with a compressor, the compressor including an inlet and an outlet, the outlet being coupled to an intake of the engine;
sensing inlet pressure and boost pressure of the compressor;
determining a value corresponding to turbocharger speed from the speed of the internal combustion engine, the inlet pressure, and the boost pressure; and
refining the value as a function of change of the boost pressure with time to represent the turbocharger speed.

2. The method of claim 1, which includes filtering the speed of the internal combustion engine.

3. The method of claim 1, which includes:
sensing inlet temperature of the compressor; and
correcting the value based on the inlet temperature.

4. The method of claim 3, wherein said determining includes determining a ratio between the inlet pressure and the boost pressure.

5. The method of claim 1, wherein said refining includes filtering the boost pressure.

6. The method of claim 5, wherein the function corresponds to a time derivative of the boost pressure.

7. The method of claim 6, which includes:
sensing inlet temperature of the compressor;
correcting the value based on the inlet temperature;
filtering the speed of the internal combustion engine; and
performing said determining in accordance with a ratio between the inlet pressure and the boost pressure.

8. A method, comprising:
providing an internal combustion engine including a turbocharger, the turbocharger including a compressor with an outlet coupled to an intake of the engine;
determining a turbocharger speed estimate from speed of the engine and a pressure ratio for the compressor; and
adjusting the turbocharger speed estimate as a function of compressor boost pressure variation with time.

9. The method of claim 8, which includes correcting the turbocharger speed estimate for temperature.

10. The method of claim 8, wherein the pressure ratio is between the boost pressure and compressor inlet pressure.

11. The method of claim 8, wherein the function corresponds to a time derivative of boost pressure.

12. The method of claim 11, wherein the time derivative of boost pressure is represented by a discrete time domain relationship.

13. The method of claim 12, which includes filtering the speed of the engine and the boost pressure.

14. A system, comprising:
an internal combustion engine;
a speed sensor operable to provide a first signal representative of engine speed;
a turbocharger including a compressor with an inlet and an outlet, the outlet being coupled to an intake of the engine;
a pressure sensing arrangement operable to provide a second signal representative of intake pressure of the compressor and a third signal representative of outlet pressure of the compressor; and
a controller responsive to the first signal, the second signal, and the third signal to determine a value as a function of the engine speed and a pressure ratio, the pressure ratio being between the intake pressure and the outlet pressure, the controller being operable to adjust the value based on variation of the outlet pressure with time to provide a fourth signal representative of turbocharger speed.

15. The system of claim 14, wherein the variation of the compressor outlet pressure is characterized by a discrete time domain relationship.

16. The system of claim 14, wherein the controller includes means for filtering the engine speed and the outlet pressure of the compressor.

17. The system of claim 14, further comprising a temperature sensor operable to provide a fifth signal corresponding to compressor inlet temperature.

18. The system of claim 17, wherein the controller is further operable to correct the value for temperature in accordance with the inlet temperature.

19. The system of claim 14, wherein the turbocharger includes a turbine in fluid communication with an exhaust manifold of the internal combustion engine.

20. The system of claim 19, further comprising means for recirculating exhaust gas, said recirculating means being responsive to the fourth signal representative of the turbocharger speed.

21. An apparatus, comprising:
means for sensing speed of an internal combustion engine, the engine including a turbocharger with a compressor, the compressor including an inlet and an outlet coupled to an intake of the engine;
means for filtering the speed of the internal combustion engine;
means for sensing inlet temperature, inlet pressure, and boost pressure of the turbocharger compressor;
means for filtering the boost pressure;
means for determining a value corresponding to uncorrected turbocharger speed from the speed of the internal combustion engine, the inlet pressure, and the boost pressure;
means for correcting the value with the inlet temperature to correspond to a temperature corrected turbocharger speed; and
means for refining the value as a function of a time derivative of the boost pressure to provide a refined turbocharger speed.

* * * * *